(12) United States Patent
Rainsford

(10) Patent No.: US 7,158,676 B1
(45) Date of Patent: Jan. 2, 2007

(54) INTERACTIVE SYSTEM

(75) Inventor: Patrick J. Rainsford, Dublin (IE)

(73) Assignee: Emuse Media Limited, Sandymount Dublin (IE)

(*) Notice: Subject to any disclaimer, the term of this patent is extended or adjusted under 35 U.S.C. 154(b) by 0 days.

(21) Appl. No.: 09/889,966

(22) PCT Filed: Jan. 28, 2000

(86) PCT No.: PCT/IB00/00135

§ 371 (c)(1),
(2), (4) Date: Nov. 8, 2001

(87) PCT Pub. No.: WO00/45599

PCT Pub. Date: Aug. 3, 2000

(30) Foreign Application Priority Data

Feb. 1, 1999  (GB) ................. 9902235.2

(51) Int. Cl.
G06K 9/46 (2006.01)
H04N 5/44 (2006.01)
G06F 3/00 (2006.01)

(52) U.S. Cl. .............. 382/190; 382/305; 348/700; 707/104.1; 386/52; 715/716; 725/37

(58) Field of Classification Search ........... 382/305; 345/951; 348/700, 701; 386/46, 52; 715/716–726; 725/37–61
See application file for complete search history.

(56) References Cited

U.S. PATENT DOCUMENTS 5,561,457 A * 10/1996 Cragun et al. ............ 725/137
5,590,262 A * 12/1996 Isadore-Barreca ........ 715/500.1
5,708,845 A * 1/1998 Wistendahl et al. ...... 715/500.1
6,205,231 B1 * 3/2001 Isadore-Barreca et al. .. 382/103
6,357,042 B1 * 3/2002 Srinivasan et al. .......... 725/32
6,426,778 B1 * 7/2002 Valdez, Jr. ................ 348/461
6,449,608 B1 * 9/2002 Morita et al. ............... 707/3
6,570,587 B1 * 5/2003 Efrat et al. ................. 715/723
7,013,051 B1 * 3/2006 Sekiguchi et al. .......... 382/305

OTHER PUBLICATIONS

Michihiko Minoh, "Intelligent Retrieval for Video Media" Artificial Intelligence Academy Journal, vol. 11, No. 1, Jan. 1, 1996.

* cited by examiner

Primary Examiner—Jingge Wu
Assistant Examiner—Aaron Carter
(74) Attorney, Agent, or Firm—Timothy J. Keefer; Seyfarth Shaw LLP

(57) ABSTRACT

An interactive system provides a video program signal and generates interactive content data to be associated with at least one object within a frame of the video program. The interactive content data is embedded with the object and the object is tracked through a sequence of frames and the interactive content data is embedded into each one of the frames. The program frames with the embedded data are multiplexed with video and audio signals and may be broadcast. A receiver identifies an object of interest and the embedded data associated with the object is retrieved. The embedded data may be used for e-commerce.

35 Claims, 9 Drawing Sheets

INTERACTIVE SYSTEM

BACKGROUND OF THE INVENTION

1. Field of the Invention

This invention relates to an interactive system and particularly to a system for multiplexing data in a digital video signal.

2. Description of Related Art

It is known to provide a video programme in the form of a digital signal which may be broadcast, or which may be provided on a digital video disk (DVD) or a video tape and the present invention is not restricted to the form in which the video signal for a programme is provided.

With the increasing number of television broadcasting channels, there is a dilution of advertising revenue since, for commercial reasons, an advertiser restricts their marketing effort to a limited number of broadcast channels. In addition, there is an increase in availability of devices available to a viewer for preventing the reception of unwanted advertisements, e.g. a V-chip, but at the present time there is currently no way of selectively blocking advertisements, with the result that those advertisements that may be of interest to a viewer are also blocked.

With the growing use of the Internet, users are becoming accustomed to having access to large and diverse sources of data and information using a personal computer (PC) or, for example, a digital set-top box used in conjunction with a television and remote control or mouse.

The present invention seeks to provide a system which enables a viewer to interact with a video signal which may be broadcast so as to facilitate information transfer and/or transactions that may be performed over the Internet.

BRIEF SUMMARY OF THE INVENTION

According to one aspect of this invention there is provided an interactive system including means for providing a video programme signal, means for generating interactive content data associated with at least one object, said data being associated with frames of said video programme signal in which the object appears, means for multiplexing said data with said video programme signal, means for viewing the video programme signal, means for retrieving said data and means for using said data to obtain details of said object.

Preferably, said means for using include means for accessing an interactive Web site to obtain said details of said object. Conveniently, said means for using further include means for producing a list of details of said object and means for selecting from said list.

Advantageously, said means for accessing an interactive Web site is adapted to secure details of said object which may include a purchasing transaction for said object or browsing an advertising catalogue.

Preferably, the means for generating includes means for tracking said object in each frame of said video programme signal in which said object appears and means for identifying the location of said object in each said frame.

Preferably, each frame of said video programme includes said interactive content data.

Advantageously, said tracking means includes means for determining scene breaks and means for searching for said object in a next frame in which said object appears.

Conveniently, said multiplexing means includes means for synchronising said data with audio and video data of said programme signal to generate a transport stream, for example, a MPEG-2/DVB transport stream.

Advantageously, said system includes means for broadcasting said transport stream via, for example, at least one of a satellite, terrestrial and cable network.

Conveniently, said means for retrieving includes one of a mouse, a keyboard, and remote control device.

According to a second aspect of this invention there is provided apparatus for associating data representative of an object with a digital video programme including means for providing a digital video programme having plural individual frames at least some of which incorporate said object, means for selecting a frame of the video programme in which said object appears to provide a key-frame, means for selecting said object within the key-frame with which data is to be associated, means for extracting attributes of the object from the key-frame, means for associating interactive data with the object in the key-frame, means for utilising the attributes of the object for tracking the object through subsequent frames of the video programme, whereby said interactive data is associated with the object in subsequent frames of the video programme in which said object has been tracked and said interactive content data is embedded with data representative of said object in a data sequence.

Advantageously, means are provided for converting said data sequence to a standard data sequence, for example, an MPEG-2/DVB compliant data sequence.

Where the video programme is in an analogue format means are preferably provided for converting the programme to digitised form.

Preferably, the means for selecting a frame of the video programme includes means for producing an edit list to divide the digitised video programme into a plurality of sequences of related shots, and means for selecting at least one key-frame from within each sequence.

Advantageously, the means for producing an edit list further includes means for parsing the video programme by identifying separate shots in the video programme to produce the edit list, means for identifying shots containing related content to form a sequence of shots containing related content, and means for producing a hierarchy of groups of shots.

Advantageously, said means for parsing include means for inputting criteria to be used to recognise a change of shot.

Preferably, the means for extracting attributes of the object includes means for isolating the object within a boundary formed on the frame, means for performing edge detection within the boundary to identify and locate edges of said object, and storing means for storing a geometric model of said object.

Conveniently, said means for extracting attributes of said object also includes means for recording at least one of the attributes of shape, size, position, colour, texture, intensity gradient of said object, and time series statistics based on said attributes.

Advantageously, said means for extracting attributes of said object includes means for comparing said attributes of said object with attributes of objects previously stored to determine whether the object is distinguishable therefrom, and when said object is determined not to be distinguishable, providing means for re-defining the object, for example by re-defining said boundary.

Preferably, said means for extracting said attributes includes means for comparing the location in the frame of said object with the location of objects already stored for that frame to determine whether that object is distinguishable therefrom, and where the location of said object is not distinguishable from the location of another object providing means for assigning rank to the objects to determine which object will be associated with that location.

Preferably, the means for tracking the object includes means for updating the stored attributes of the object as the object moves location within different frames.

Advantageously, said means for tracking includes plural algorithm means for use depending on the visual complexity of a sequence to automatically track objects in different types of visual environment.

Advantageously, said tracking means includes means for converting all the frames to be tracked to a low-level representation, means for determining the position of each object in the frames by minimising a distance measure to locate each object in each frame, means for processing the positions of said object to smooth over occlusions and the entrances and exits of objects into and out of said frames, and means for reviewing the object within a tracked sequence and for correcting the location attributes of any misplaced objects.

Preferably, the means for associating includes means for providing a database of different types of data including one or more of URLs, HTML pages, video clips, audio clips, text files and multimedia catalogues, and means for selecting said interactive content data from the database to associate with said object.

Preferably, the means for associating produces said data sequence using means for determining whether the embedded interactive content data is frame synchronous data associated with object positions, shapes, ranks and pointers in a frame, or group-synchronous data associated with all the objects in a group, or is data to be streamed just in time, wherein means are provided for associating frame synchronous data with the corresponding frame, means are provided for associating group synchronous data with the frame at which a group changes, and means are provided for streaming just in time data to a user before it is required to be associated with the corresponding objects.

It will be understood that although the above has been defined in relation to associating interactive content data with one object, different interactive content data may be associated with respectively different objects.

According to a third aspect of this invention there is provided apparatus for embedding a data sequence within a generic digital transport stream (such as DVB/MPEG-2 or ATSC/MPEG-2) including means for receiving a data sequence of interactive content data associated with an object in a digitised video signal, means for synchronising the data sequence with the video and audio of the digitised video signal to generate a further transport stream, and means for associating a packet identifier with the further transport stream.

In a preferred embodiment, means are provided for broadcasting the further transport stream to viewers.

Preferably, the means for receiving a data sequence includes means for receiving elementary streams comprising a digital video signal stream, a digital audio stream, a digital data sequence stream and a digital control data stream, means for packetising each of the data streams into fixed size blocks and adding a protocol header to produce packetised elementary streams, and means for synchronising the packetised elementary streams with time stamps to establish a relationship between the data streams.

Preferably, the means for synchronising the data sequence includes means for multiplexing packetised elementary streams into transport packets headed by a synchronisation byte, and means for assigning a different packet identifier to each packetised elementary stream.

Advantageously, means for synchronising the packetised elementary streams with time stamps includes means for stamping with a reference time stamp to indicate current time, and means for stamping with a decoding time stamp to indicate when the data sequence stream has to be synchronised with the video and audio streams.

Conveniently, the means for broadcasting the further transport stream to users includes means for providing a programme association table listing all the channels to be available in the broadcast, means for providing a programme map table identifying all the elementary streams in the broadcast channel, and means for transmitting the programme association table and the programme map table as separate packets within the further transport stream.

According to a fourth aspect of this invention there is provided apparatus for retrieving data embedded in a generic digital transport stream in which the embedded data includes a data sequence of data associated with objects represented by the generic digital transport stream, said apparatus including means for recognising a packet identifier within the video signal, means for extracting the data sequence from the generic digital transport stream, means for identifying objects within the video sequence from which to retrieve associated data, means for synchronising said data sequence to said identified objects and means for interactively using said associated data.

Preferably, said means for identifying objects includes means for selecting an object within a frame, means for displaying data associated with said object, means for selecting data from a list of displayed data, and means for extracting the embedded data associated with the data relating to said object.

Conveniently, means are provided for selecting a frame to display the objects having embedded associated data, means for selecting one of the displayed objects to display a list of the data associated with said object, and means for selecting from said list.

Conveniently, the means for selecting includes means for storing the frame for subsequent display and subsequent recall of the frame.

In a preferred embodiment, the extracted embedded data is applied to means for accessing an Internet web site to facilitate interactive communication such as e-commerce.

By using the present invention, advertisements produced by advertisers are unobtrusive, i.e. the viewer can watch the programme without interacting, if so desired. Alternatively, the viewer can view the programme and freeze a frame of the programme, click on an object using a mouse, keyboard or TV remote control and, over the Internet, facilitate an e-commerce transaction. In performing such a function the viewer may split the VDU screen so that one portion continues to display the running programme and another portion displays the frozen frame and the Internet information transfer.

The invention can be used in numerous aspects of digital video entertainment, especially broadcasting, i.e.

1. Interactive product placement in regular television programmes or movies.

2. Fashion TV.

3. Music TV.

4. Educational programmes.

The e-commerce may facilitate, for example, merchandising to ticket sales.

The invention has the advantage that a viewer is able to select further information on those items of interest within a video signal programme without being overwhelmed with information of no relevance. This is particularly useful where the information is in the form of advertisements and is achieved by making objects viewed in the video programme have associated multiplexed (embedded) data to provide links to further information relevant to those objects, either to information within the video signal or stored in a database or by accessing an Internet web site.

As far as the advertiser is concerned, the invention has the advantage that advertisements can be precisely targeted to a relevant audience and the advertisements cannot be stopped from reaching the user by a device for blocking out advertisements, e.g. a V-chip. Because multiple advertisers may associate their advertisements with each frame of a video programme sequence, the invention has the potential of reducing the costs of advertising to individual advertisers while maintaining or increasing advertising revenues for programme makers and suppliers. In this way, data-carrying potential of each frame of a video programme signal may be maximised and maximum use of the data-carrying capacity of broadcast channels may be achieved. The present invention is believed to lead the way to generating a new democracy for advertisers that may not be able to afford, for example, a two minute segment on broadcast TV at peak times. This is because the present invention allows multiple advertisers per object, and/or multiple objects per frame, leading to a high level of flexibility in advertising revenue models.

In the field of, for example, music videos, the content may be used to promote the music of the band for the record label and by interacting with the musicians, a user may purchase and download the music directly.

Additionally, plural advertisers may be buying the same slot—in other words, the advertiser's content is totally fused within the programme content and it is not until the advertising content is downloaded by the user that it is read. Thus, every frame of a digital TV programme may be used as advertising revenue. An e-commerce database may store all relevant data concerning the advertisers, from URL addresses of Web sites to catalogues, brochures and video promotions, to e-commerce transaction facilities.

When a viewer selects an object by, for example, using a mouse to click on the object, that object may represent a number of advertisers, e.g. a musician may advertise clothing, a watch, cosmetics, and a musical instrument, so that the viewer selects from a list of promoted items associated with the object. There is, thus, presented a push technology approach which maximises the transmission speed of a satellite broadcast. The user needs only a return path via the Internet if he actually wishes to carry out a transaction.

BRIEF DESCRIPTION OF THE SEVERAL VIEWS OF THE DRAWINGS

The invention will now be described, by way of example, with reference to the accompanying drawings, in which.

In the Figures like reference numerals denote like parts.

DETAILED DESCRIPTION OF THE INVENTION

Figure 1:
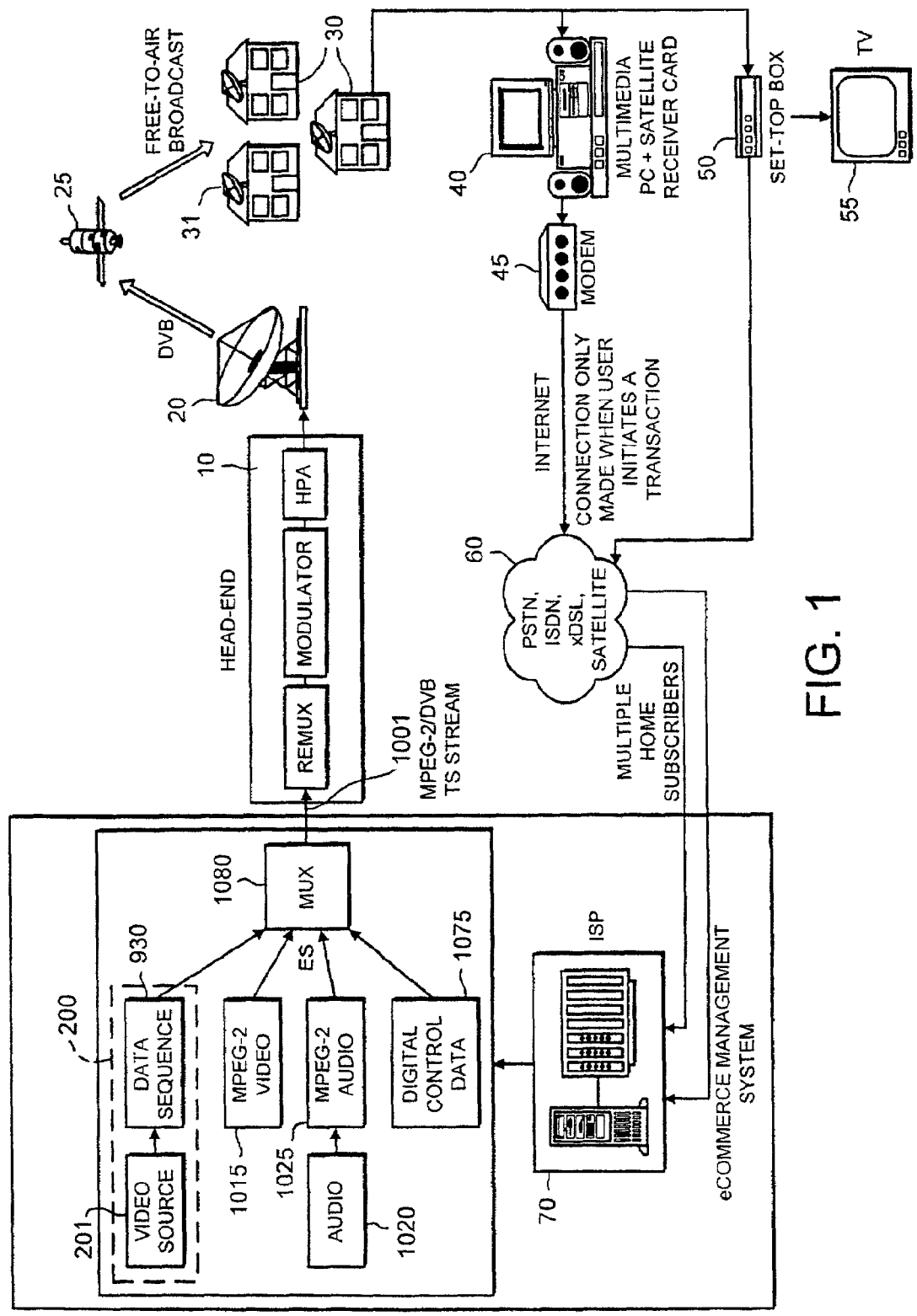
FIG. 1 shows a block schematic diagram of an interactive system of this invention.

The interactive system shown in FIG. 1 has apparatus 200 for producing a data sequence that is representative of interactive content data associated with at least one object which is multiplexed 1080 with video and audio data representative of the digital video programme. In the described embodiment, a data transport stream 1001 is applied to head end apparatus 10 of a satellite broadcast device 20 that transmits to a satellite 25 that, in turn, re-transmits the broadcast signal to plural users/viewers 30 each having a respect broadcast receiving dish 31. The received signal may be applied to a PC 40 having a TV card for interaction by a viewer. The received broadcast signal may also, or alternatively, be applied to a set top box 50 of a digital television 55 or a television with integrated set top box electronics. The set top box may be provided with a keyboard (not shown) or a mouse 56 for a viewer to manipulate an icon on the TV to select objects and interact with menus and operations that may be provided. The PC 40 may similarly be provided with a keyboard, but, as is customary, also a mouse so that the manner of use is the same as the set top box, so a viewer/user is able to select an object and perform interactive communication. Input and output to and from the PC is via a modem 45 to a public telephone network 60 which may be, for example, PSTN, ISTN, xDSL, or satellite, and the set top box 50 is similarly connected to the network 60. The network 60 interconnects the multiple viewers with an e-commerce management system 70 that may be a dedicated management system or a system inter-linked with an Internet service provider. In a system where a video programme is broadcast, the system 70 is connected to the broadcast providing system so that the system 70 can tie-in with the broadcast programme for maintaining a reference between the objects transmitted to a viewer.

In the system of this invention an object which may be, for example, a person, physical objects such as clothing, a watch, cosmetics, musical instruments or, for example, a trademark has data associated with that object multiplexed (embedded) into the video programme signal of the programme that carries the object. To achieve this it is necessary to identify and track objects frame by frame throughout the video programme. It is to be understood that although in the described embodiment the video programme is broadcast, the video programme could be on a digital video disk (DVD), tape or any known means for storing a video programme. The viewer upon selecting an object is then able to interact with details concerning the object. For example, where the object is a musician in a pop musical video, information may be derived as to where the music record, clothing worn and advertised by the musician may be secured over the Internet.

The first stage is to produce the interactive data that will be dynamically associated with the, or each, object in every frame of a programme in which the object appears. A five-minute video sequence, for example, will typically consist of 7,500 frames, whereas a ninety-minute movie may be 135,000 frames.

If the input video programme is not in a digital format, the programme must first be digitised by means known per se.

Figure 2:
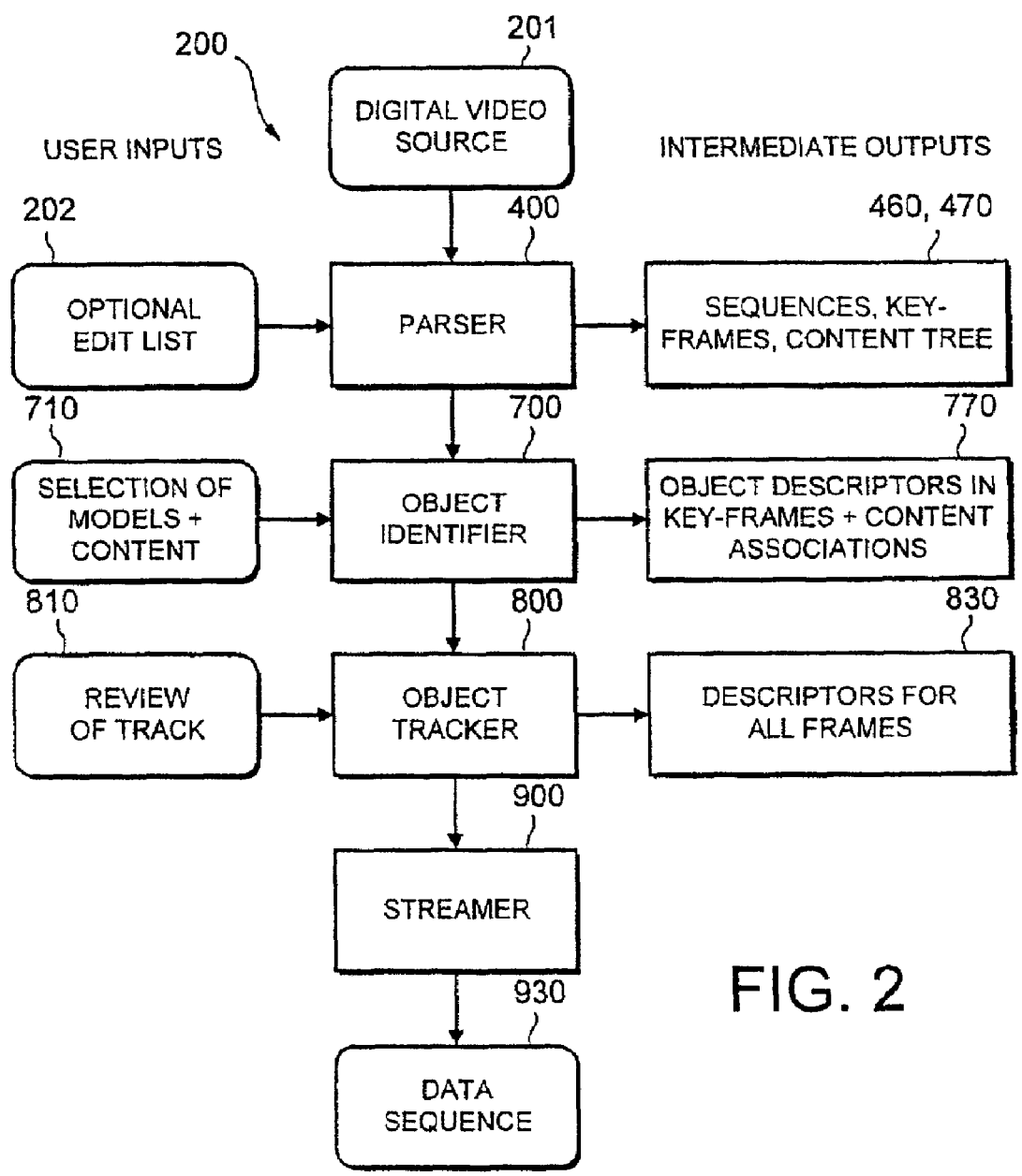
FIG. 2 shows a block schematic diagram of video programme processing for generating interactive content data associated with an object in relevant frames of a programme.

Referring to FIG. 2, the apparatus 200 for generating the interactive content data associated with an object in relevant frames of a programme is shown. The digitised programme from a digital video source 201 is divided into related shots 300 (shown in FIG. 3) by a parser 400, shown in detail in FIG. 4. In the context of this invention a "shot" is a single camera "take" of a scene. A five-minute video sequence may typically have one hundred such shots or edits consisting of a series of frames Fn where, for example, Fn=25×60×5=7, 500 frames, whereas a ninety-minute video may have thousands of shots. If the digitised video programme is supplied with an optional edit list 202, which edit list indicates at which frames the shots 300 change, this may be utilised to divide the programme into the separate shots 300.

Figure 3:
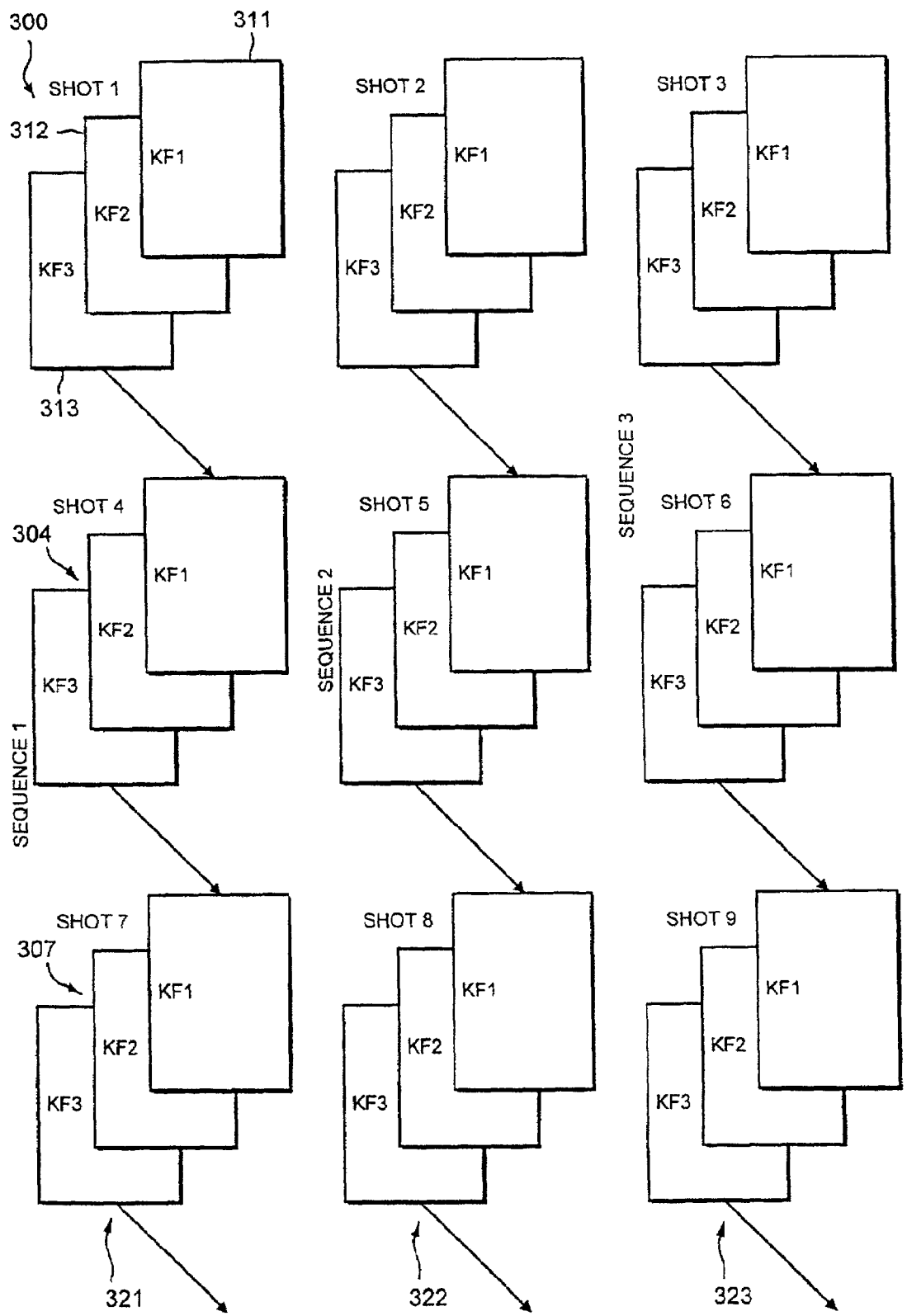
FIG. 3 shows a schematic diagram indicating programme sequences derived by groups of related camera shots.

Basically, the parser 400 deconstructs the video into a group of sequences 321, 322, 323 (FIG. 3). The sequences consist of a series of semantically related shots and, for example, one sequence may contain all the shots that feature the lead singer in a pop music video. Therefore, the function of the parser 400 is to deconstruct the programme into sequences unified by a common thread. The operation is necessary so that the tracker 800, described hereinafter, will only search for objects in sequences where they are likely to be found. The parser 400 detects shot changes, camera angle changes, wipes, dissolves and any other possible editing function or optical transition effect. The parser 400 shown in FIG. 4 receives the digital programme and the end of a shot is detected 410, e.g. by comparing edge maps of each successive frame of the video programme and stipulating that an end of shot occurs when a change in location of the edge map occurs which exceeds a predetermined threshold. The criteria 420 to be used to determine the end of a shot is input into the cut/shot detection programme by a user who is embedding data associated with an object into the video programme sequence. Information of different shots is put into an edit list 430.

A number of frames are then selected in a key-frame identifier 440 from each shot 300 to become key-frames 500 (see also FIG. 5) which are representative of that shot 300. More than one key-frame may be needed for each shot where the shot 300 includes, for example, complex camera moves, such as pans or zooms, so that one key-frame 500 is not representative of the total content. Furthermore, if the video programme is of a pop group, and the sequence starts with a long shot of all the band members and speedily zooms onto the lead singer and ends with the lead singer's face filling the screen, no single frame would be representative of the whole shot, but a valid selection of three key-frames would be, for example, the first frame 311, a frame 312 about half-way through the zoom, and a final frame 313 (shown in FIG. 3). Thus, key-frames 311, 312 and 313 are automatically selected which are representative of the video content of the shot 300.

Figure 4:
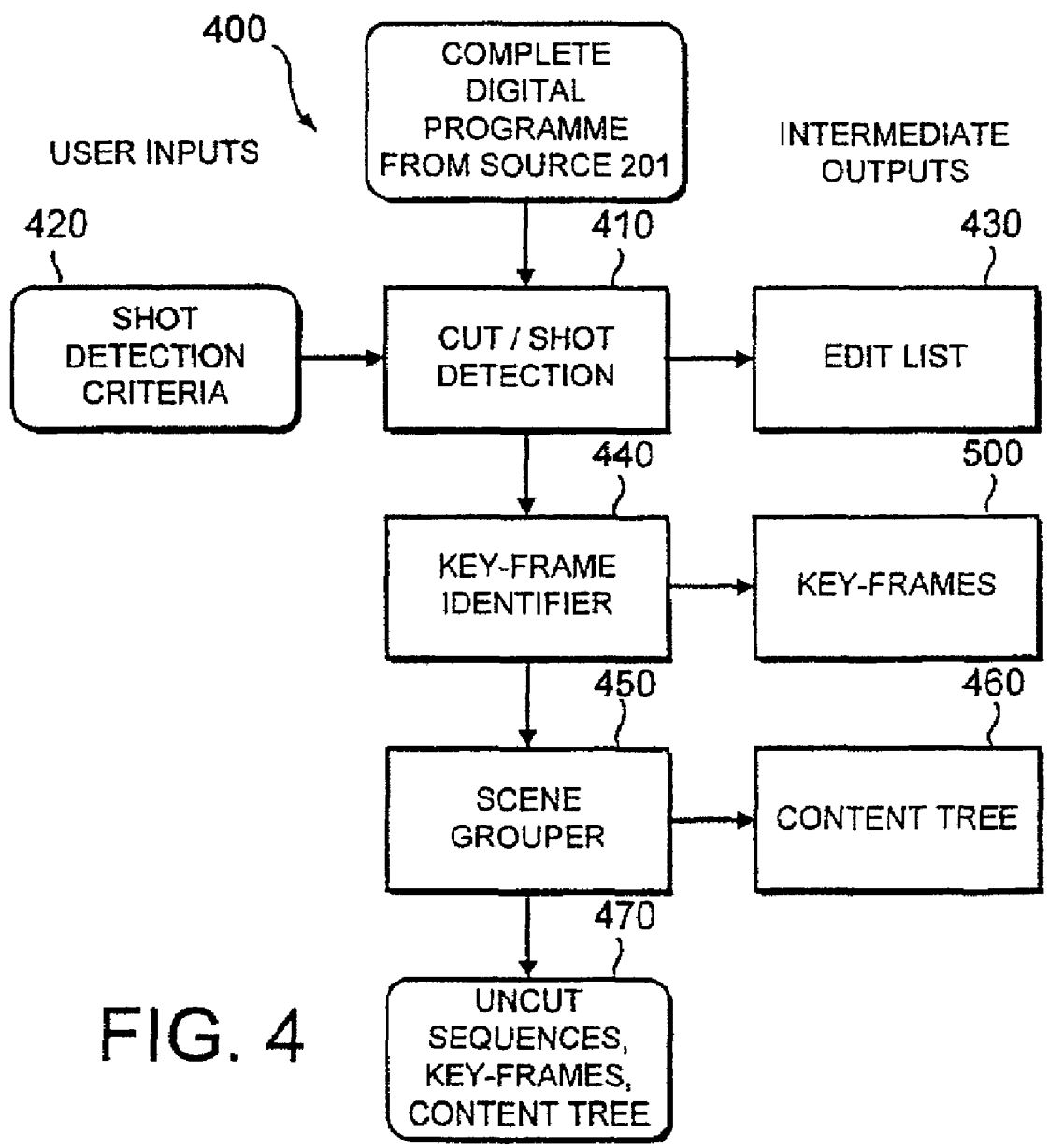
FIG. 4 shows a block schematic diagram of a parser shown in FIG. 2, whereby groups of shots are produced.

As shown in FIGS. 3 and 4, the shots 300 are grouped into sequences by a scene grouper 450 which compares the key-frames 311–313 from each shot 300 with the key-frames 311–313 from each others shot 304, 307. This is performed by comparing the key-frames from the shots using low level features such as colour correlelograms, data maps and textures. Shots that have similar content are grouped together into a hierarchical structure by the scene grouper 450 into groups of shots having a common theme. For example, in a pop music video, it may be that there are several different sets used, but one set may appear in many places in the video. The scene grouper 450 groups sequences of the shots 300, 304, 307 using the same set on one level and similar types of shots/sequences of the same set at another level. In this way, a hierarchical structure, termed a content tree 460, of sequences is built up. The purpose of the grouping is to aid in the selection of objects to be identified by interactive content data and also improve the efficiency of the subsequent tracking of the selected object through the video programme (described hereinafter) by ensuring that searching for a particular object is carried out only within related shots 300, 304, 307 and not through all shots of the film. The parser 400 thus assists the user to grasp the full structure and complexity of the video programme by providing a powerful browsing and object selection device as well as increasing the efficiency of the tracker by limiting tracking of an object to related shots, i.e. shots in sequences 321, 322, 323.

Having grouped the shots 300 into sequences 321, 322, 323, sequence key-frames are selected from the key-frames 311, 312, 313 of each shot to represent the sequence. A user wishing to input interactive content data representative of an object into a video programme may then use these high level key-frames to select those sequences of shots which contain objects of interest to the user. These key-frames are preferably presented to the user in a form representing the hierarchical structure in the content tree 460 of the sequences 321, 322, 323. An output 470 of the scene grouper 450 is a number of sequences of single shots, key-frame 311, 312, 313 representing the sequences and a content tree showing the hierarchical relationship between the sequences, as reflected by the key-frames.

Figure 5:
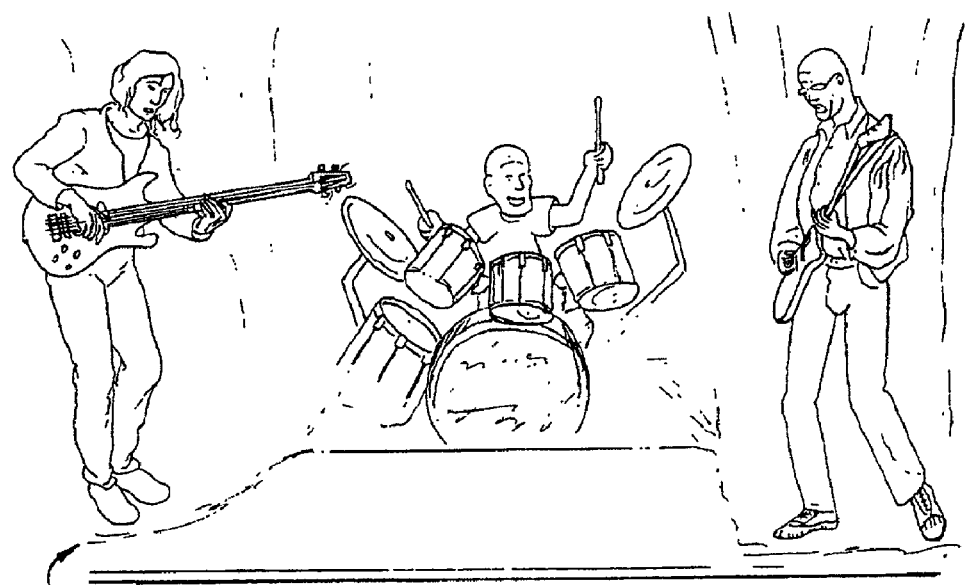
FIG. 5 shows a key frame of a video programme.
Figure 6:
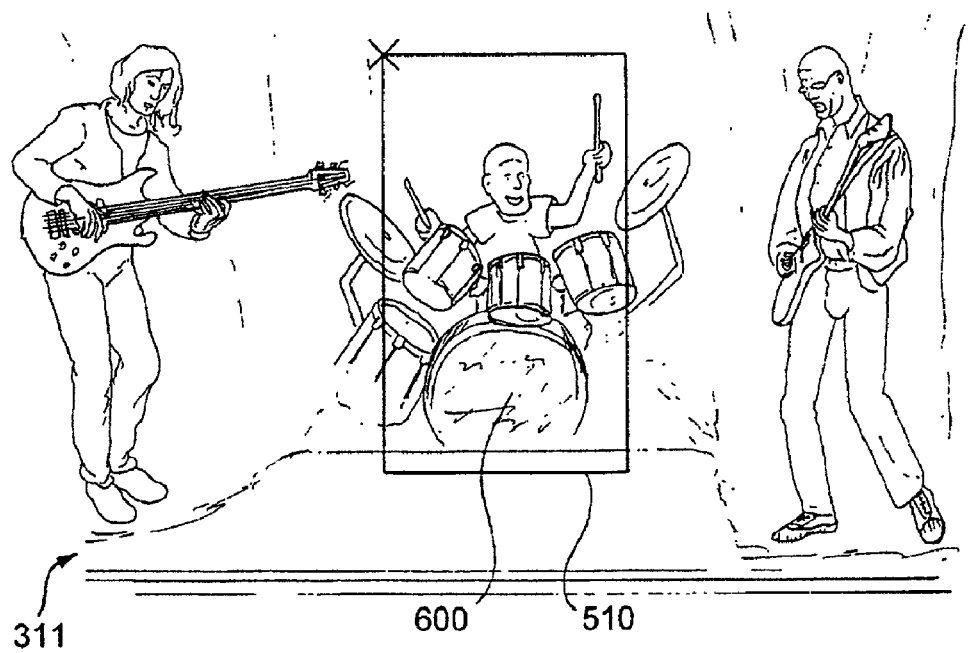
FIG. 6 shows an object selected in the key frame of FIG. 5.

The user intending to insert the interactive content data into the video programme views the hierarchical structure of the key frames and selects a first key-frame 311, as shown in FIG. 5. In a preferred embodiment, all the key-frames may be presented to a user on a screen in miniaturised form and the user may position a cursor over the miniaturised key frame and select that key-frame. A full-sized version of the key-frame may then be presented to the user for selection of objects from the key frame 311. The user then marks with a pointing device, such as a mouse, an object 600 within the key-frame 311 which the user intends to associate with interactive content data embedded in the programme video (as shown in FIG. 6). The object may be marked by drawing a boundary box 610 around the object. To select the object 600 in the key-frame 311, the user clicks a mouse button when the cursor is at the top left corner and drags the mouse cursor to the bottom right corner of the object 600 so that the boundary box 610 is displayed around the selected object 600.

For example, to embed data information about a pop group tour date, the entire key-frame may be selected. If the key-frame contains a keyboard then the keyboard may be selected to advertise the keyboard and/or sell the keyboard on behalf of the keyboard manufacturer. Also, the lead singer who appears in the key-frame may also be selected.

The boundary box shown in FIG. 6 is rectangular, which is a preferred default shape, but other shapes may be used such as a parallelogram or a user defined polygon.

Figure 7:
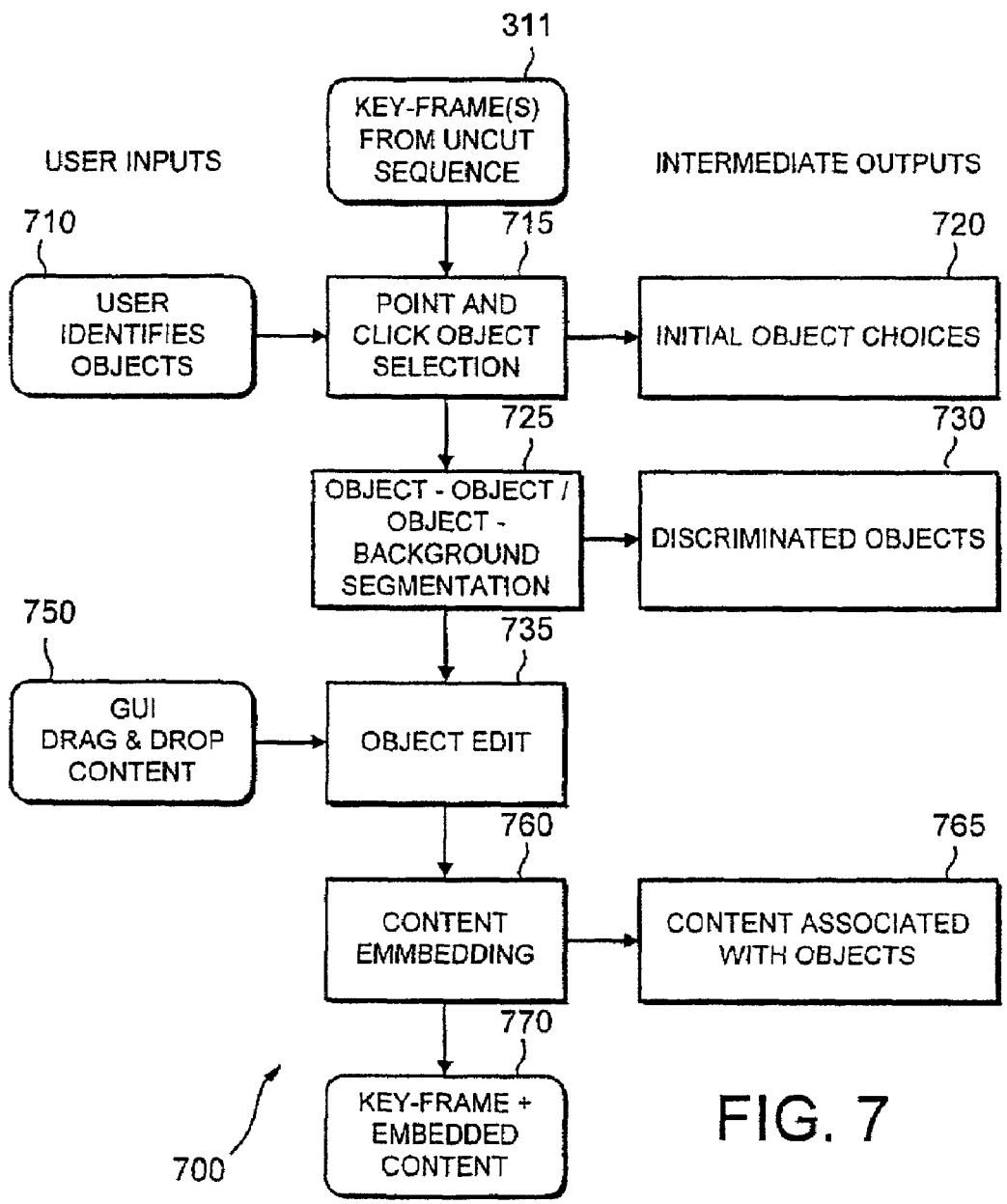
FIG. 7 shows a flow diagram for frame by frame identification of objects in a video programme.

The selection of objects is made and the object identified 600, as shown in detail in FIG. 7. Thus, the user-identifies objects 710, points to and clicks on the object 600 to provide initial object choices 715. As each object 600 is selected in the key-frame 311, attributes used to track the object through successive frames are calculated and compared with the attributes of objects already recorded 720 to ensure that the new object is distinctly different from all other objects already recorded for that frame. These attributes may include any of shape, size, position, colour, texture and intensity gradient of the object, as well as time series statistics based on these attributes. If a new object is too similar to previously recorded objects, the user is prompted for extra information about the new object. Otherwise, the attributes of the object are recorded.

The selected object in block 725 is viewed isolated from the rest of the frame. The user may then change the boundary box 610 to define the object 600 by discriminating 730 against other objects more precisely, or if two objects overlap so that they occupy the same location on the screen, the user may indicate which object takes precedence by assigning a rank to each of the overlapping objects. For instance, in the example given above, information on the group's tour dates, which is associated with a whole frame, may be given a low rank so that, for example, any other object appearing anywhere in the frame will always have a higher rank and not be overridden by the data associated with the whole frame 311. This process is repeated for each of the key-frames 311 representing each of the sequences 321, 322, 323.

As each object is selected in the key-frame, the next step is to identify the object using data and embed the date with the object. Preferably, record addresses of data are held in a database, the data being associated with a particular object or, alternatively, instead of using a record address, the data itself may be embedded. Preferably, a graphical user interface 750 is used to drag an icon representing the data onto the object 600 within the frame 311.

Thereby the user adds the advertising content to each object in the segmented frame using a "drop and drag" technique so that, for example, an icon representing the advertiser is dragged over the object using a mouse and the relevant data is automatically embedded into the object. This process continues until all objects have been embedded with interactive data. Thereby, data representative of an object is embedded 760 into the video programme signal to provide interactive content data associated with objects 765 and a number of key-frames associated with respective embedded content data as an output 770.

Thus, the identifier 700 identifies the objects to have content embedded in them by accessing a small number of key-frames from each sequence and embedding the content.

Having embedded object descriptors in key-frames and provided content it is necessary to track the objects through the successive frames of the video programme.

Figure 8:
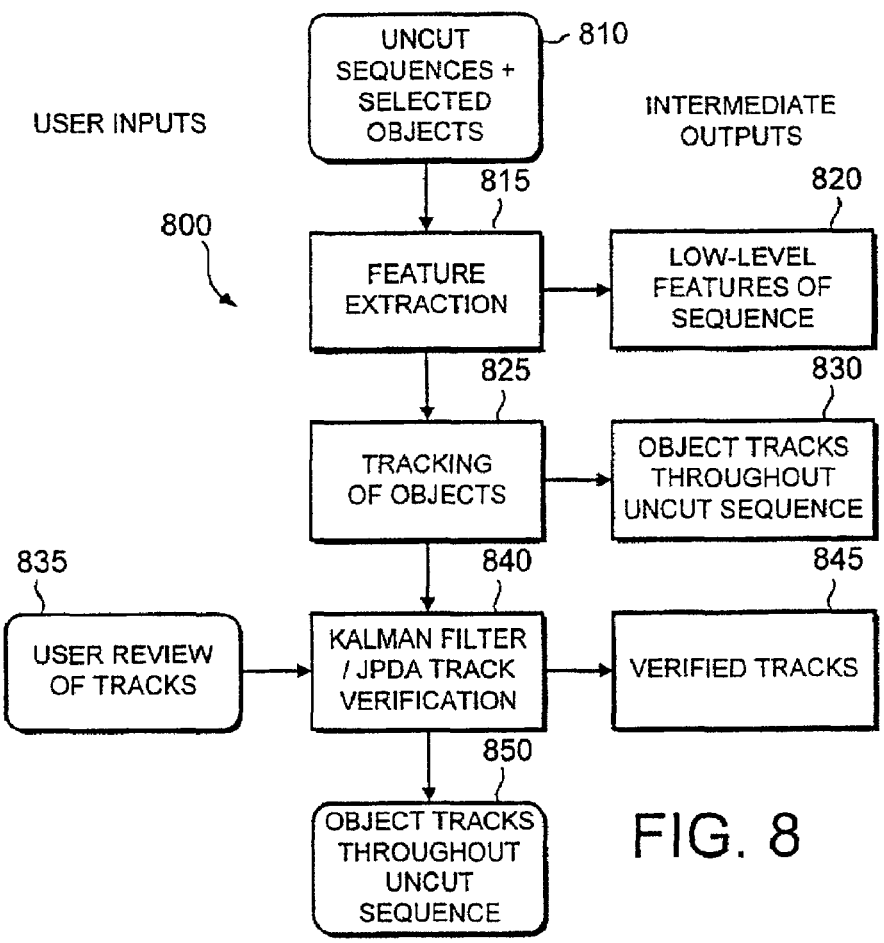
FIG. 8 shows a flow diagram of the object tracker shown in FIG. 2 for tracking the object frame by frame.

Referring to FIG. 8, it is necessary to track an object throughout the video programme and also as an object moves within frames and is occasionally obscured by other objects or leaves the frame being viewed, altogether. Basically, the objects are defined as a series of boundary shapes plus low-level feature functions, e.g. shapes, edges, colour, texture and intensity gradient information. Using this representation of the objects, they are tracked through the remaining frames of the video sequence in an iterative fashion. When the plural objects have been tracked and located in every frame in which they appear, then the relevant content that was embedded in the first key-frame 311 is added automatically to the remaining frames of all sequences and this is the function of the object tracker 800, shown particularly in FIG. 8.

Uncut sequences and selected objects 810 are converted 815 to a low-level representation 820 used to compare objects within a frame. For all frames, a distance measure is utilised to locate each object within each frame. A convenient distance measure is the Hausdorff measure, known per se, but this measure may be augmented with other techniques. Tracking 825 of the objects through sequential frames is iteratively provided whereby the object is initially defined in the key-frame as a two-dimensional geometric shape obtained by performing edge detection and segmenting out the edges encircled within the bounding box 610. The object 610 is then located in the next frame 312 and the attributes of the object updated to reflect the changes in position and shape that have occurred between the frames. The object with these new attributes is then located in the next frame and the process of tracker 800 continues.

Once the position of each object within all the frames of a sequence of shots has been determined, post-processing of the positions to smooth over occlusions and exits and entrances of objects is carried out.

The system is impervious to lighting changes, occlusion, camera moves, shots, breaks and optical transition effects such as wipes, fades and dissolves. The system uses a variety of known techniques to enable automatic tracking in all types of vision environments, e.g. using a group of algorithms, the selection of which is dependent upon the visual complexity of the sequence. These algorithms are known per se, although the person skilled in the art may use heuristics to optimise performance for tracking. The data added to the objects in the key-frames is then automatically added to the object in all frames as the object is tracked throughout the entire video sequence 830.

A user may review the tracks produced and enter any corrections 835. The corrections are made by stopping the reviewed sequence at the erroneous frame, clicking on the object which is in error and dragging it to its correct position. Thus, using a graphical user interface, the video is stopped at the location in which the location of the object is incorrectly identified and the bounding box 610 is dragged and dropped at its correct location, thereby re-defining the attributes of the object for that frame and basing the definition of the object for subsequent frames on that new definition, thereby producing verified tracks 845.

Finally, all frames in all sequences of the video will have relevant objects identified and embedded with interactive content data 850.

Figure 9:
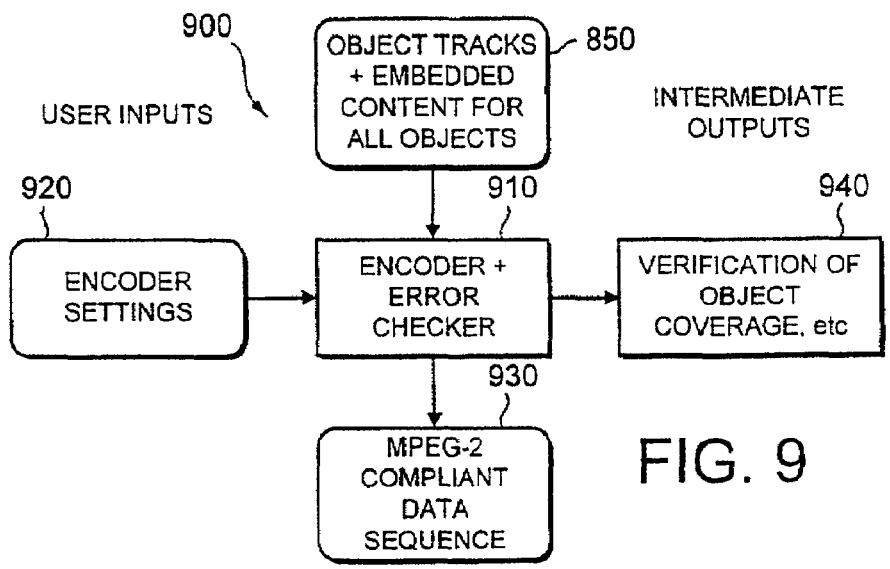
FIG. 9 shows a flow diagram of the streamer shown in FIG. 2.

Output from the tracker 800 is applied to a streamer 900, shown in FIG. 9, in which the validity of the embedded interactive content data is checked, the order that the embedded interactive content data is output is synchronised, where necessary, with the audio/visual frames.

The streamer checks that all objects in all frames have embedded content data 850 and that the content is labelled and valid using encoder setting 920 to act upon encoder and error checker 910. Verification 940 that the content is correctly labelled and valid occurs and the output 930 may be either a complete broadcasting compliant transport stream, such as MPEG-2/DVB audio, video and embedded objects and content data, or as embedded objects and content data alone.

The streamer 900 must determine in which of three categories the embedded content data falls, namely frame-synchronous data, segment-synchronous data, or data to be streamed just-in-time. Frame synchronous data consists of the object positions, shapes, ranks and pointers to a table of pointers to data may be associated with the correct frame number in the video programme from source 201. Segment-synchronous data is used to update the table of pointers to embedded content data so that when objects change, the embedded data changes. This data may be associated with the frame number at which the content changes. Data to be streamed "just in time" must be streamed to the end user before it is required by any of the objects. This transport stream is then packetised into MPEG-2/DVB compliant packets.

Figure 10:
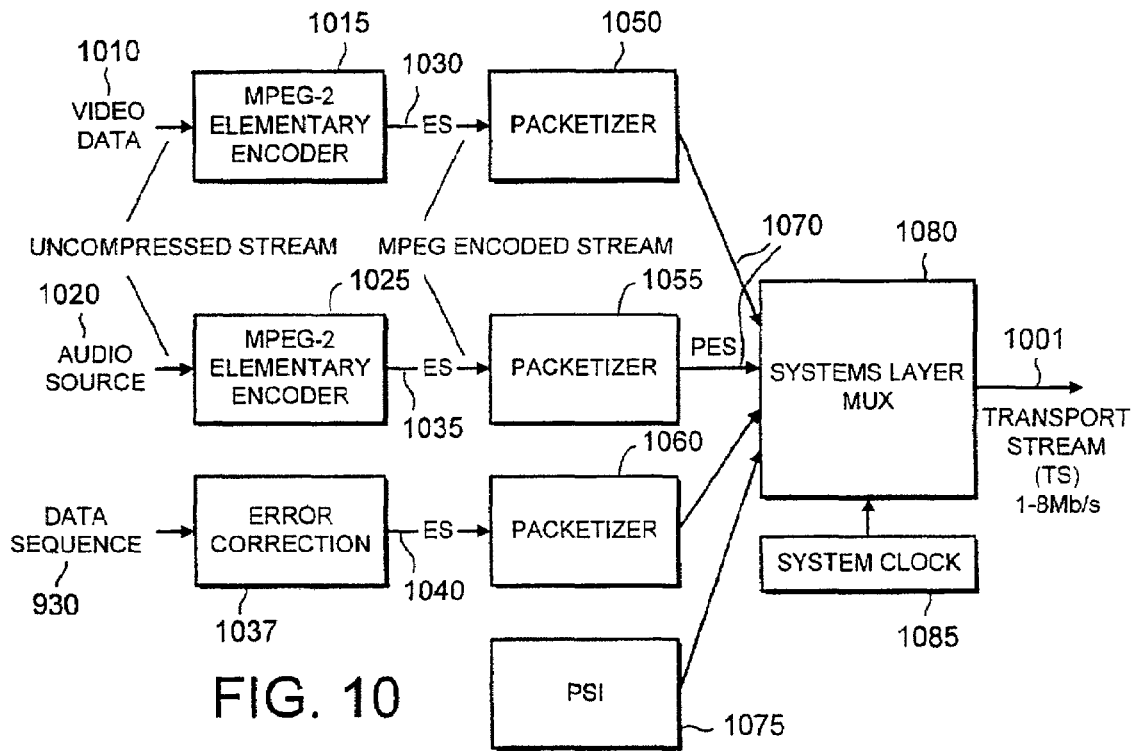
FIG. 10 shows a block schematic diagram for combining the interactive content data with the video programme signal.

If a fully embedded audio visual programme is required, the packetised transport stream and the video programme are multiplexed together, as shown in FIG. 10.

Referring to FIG. 10, the different elements that constitute the embedded video programme are combined into a single transport stream 1001 in preparation for broadcasting by a network operator. The programme consists of a video stream 1010, an audio stream 1020, both of which streams are uncompressed. Both the video data 1010 and the audio data 1020 are encoded and compressed in respective MPEG-2 elementary encoders 1015 and 1025 to produce elementary streams of data 1030, 1035 respectively. MPEG-2 compliant data sequence 930 is error checked 1037 to produce an elementary stream of data 1040. The elementary streams 1030, 1035 and 1040 are applied to packetisers 1050, 1055 and 1060, which each accumulate data into fixed size blocks to which is added a protocol header. The output from the packetisers is termed a packetised elementary stream (PES) 1070. The packetised elementary streams 1070, in combination with digital control data (PSI) 1075, is applied to a systems layer multiplexer 1080 having a systems clock 1085. The PES packet is a mechanism to convert continuous elementary streams of information 1030, 1035 and data sequence 930 into a stream of packets. Once embedded in PES packets the elementary streams may be synchronised with time stamps. This is necessary to enable the receiver (PC or TV) to determine the relationship between all the video, audio and data streams that constitute the embedded video programme.

Each PES packet is fed to the system multiplexer 1080. There the packets are encapsulated into transport packets to form the transport stream 1001 that is used for broadcast. In this respect, the transport stream 1001 carries packets in 188 byte blocks and the transport stream 1001 constitutes a full so-called eMUSE channel that is fed to the network operator for broadcast. In essence, the transport stream is a general purpose way of combining multiple streams using fixed length packets.

Figure 11:
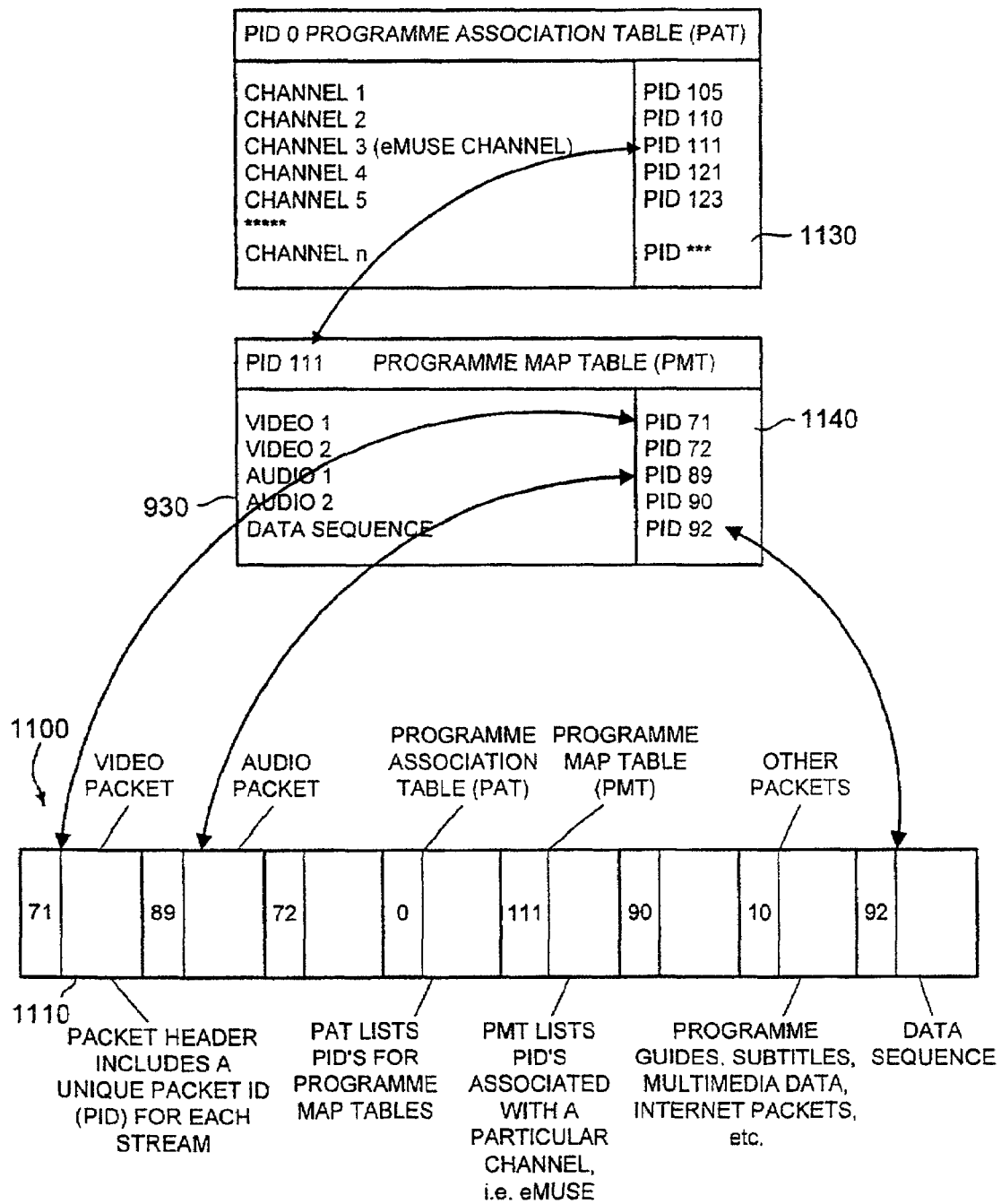
FIG. 11 shows the structure of a data packet used in this invention.

The structure of a packet is shown in FIG. 11. The packet 1100 shown in FIG. 11 has a header 1110 with a synchronisation byte, a 13-bit packet identifier (PID) and a set of flags to indicate how the packet should be processed. The transport multiplexer assigns a different packet identifier to each PES 1070 to uniquely identify the individual streams. In this way, the packetised data sequence 930 is uniquely identified. The synchronisation of the elementary streams is facilitated by sending time stamps in the transport stream 1001.

Two types of time stamps may be used:
1. A reference time stamp to indicate the current time, that is clock 1085 information, and
2. A decoding time stamp.

The decoding time stamps are inserted into the PES to indicate the exact time when the data stream has to be synchronised with the video and audio streams. The decoding time stamp relies on the reference time stamp for operation. After the transport stream has been broadcast, the PC or TV uses the time stamps to process the data sequence in relation to the video and audio streams.

In order for the receiver (PC or TV) to know how to decode the channel, it needs to access a set of signalling tables known as Programme Specific Information (PSI) labels which are sent as separate packets within the transport stream 1001 with their own PID tables. There are two tables that are needed to enable the receiver to decode a channel. The first is the programme association table (PAT) 1130 which lists all the channels that are available within the satellite broadcast and has a packet ID (PID) value of 0 which makes it easy to identify. In the example, the eMUSE channel, i.e. the channel carrying the video programme, is represented as PID 111.

A programme table map (PMT) 1140 identifies all the elementary streams contained in the embedded video signal. Each elementary stream is identified by a PID value, e.g. video from video camera 1 is PID 71. The data sequence 930 has a PID value 92 in the example of FIG. 11. The receiver video and audio decoders search the PMT table to find the appropriate packets to decode. Similarly, the programme for retrieving the embedded data searches the PMT to find the data sequence which, in the example of FIG. 11, is PID 92. The data retrieval programme then filters out these packets and synchronises them with the appropriate video and audio to enable the user to select the various objects.

Figure 12:
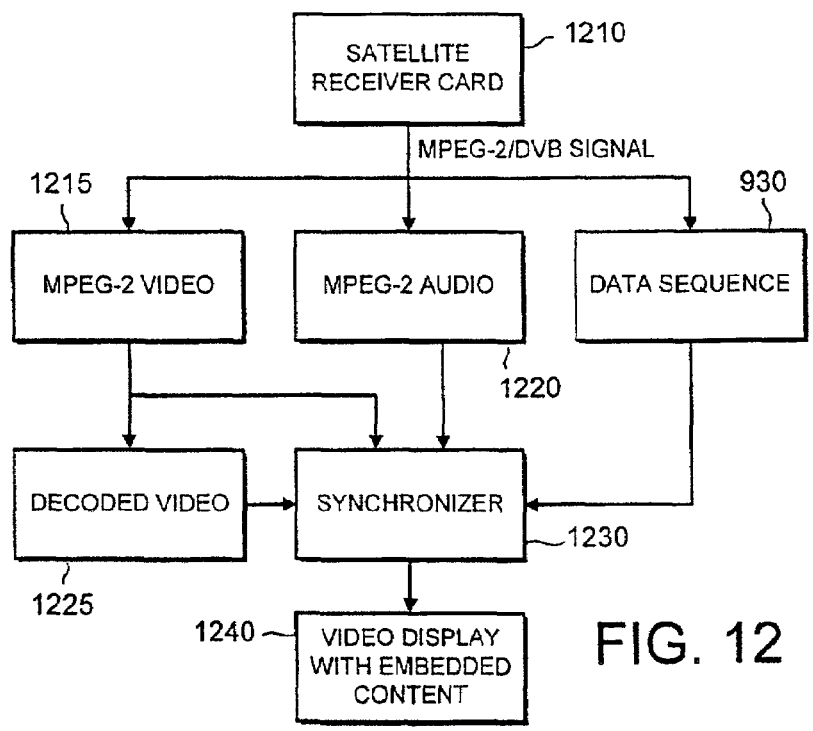
FIG. 12 shows in block schematic form the manner of extracting the interactive content data from the video programme signal.

Having embedded the interactive content data into the video programme signal, it is broadcast and the manner of reception and retrieval of the data will now be explained with reference to FIG. 12.

Hardware is provided on a satellite receiver card 1210 which resides on the user's PC 40 or digital set top box 50 and software allows the viewer to interact with the dynamic objects in the broadcast, for example to facilitate Internet access and Internet browsers, such as Internet Explorer and Netscape and, for TV applications, is compatible with Sun's Open TV operating system.

The received MPEG-2/DVB signal is separated into MPEG-2 video 1215, MPEG-2 audio 1220 and the data sequence 930 and the decoded video 1225, audio and data sequence is applied to a synchroniser 1230. Output from the synchroniser comprising the video programme with embedded interactive content data is displayed 1240 by the PC VDU or TV screen.

A user clicks a mouse 56 or presses a remote control button at a frame containing an object of interest, which causes the display on the screen to split in two. For example, on the left hand screen, the video programme continues to run as normal and, on the right hand screen, the objects present in the frame which was active the time the mouse was clicked, are displayed as cut-outs, with the intervening spaces blanked out. The user then clicks on the object of interest to see which advertisers it represents, e.g. if the user clicks on the lead singer, then the screen will display the lead singer only and a textual list of advertisers or an icon-based display of advertisers will be viewed. If the user clicks on the advertiser's name or icon, the user goes directly to view the advertised products.

After interacting with the site the user may decide to purchase the product via an e-commerce transaction. Further, if the user clicks on the suit of the lead singer, the entire catalogue of the suit manufacturer may be made available as part of the streamed digital broadcast. This return path via the Internet is purely to facilitate a transaction as the data sequence 930 initiates the push technology approach to streaming advertising information once the user has selected amongst the numerous objects within the frame.

Although the user can interact with the broadcast in such an on-line manner as described above, alternatively, the data may be viewed off-line, i.e. while a viewer continues to watch a programme, the user may select various frames during the broadcast and store the frames for later retrieval of the associated data. Where there is not sufficient local memory to store the data, addresses of the data in local or remote databases, e.g. Web sites, are stored and the end user is able to subsequently access the databases to retrieve the data. The user then selects with the mouse or the remote control the object 600 of interest and another screen may then be displayed showing the object 600 and a menu of data elements associated with that object. The user clicks one of the menu items and is able to directly view data on the advertised product or be given access to a Web site over the Internet. Alternatively, as soon as a user selects a menu item, a catalogue may be viewed which has been embedded in the broadcast signal.

The data which the end user accesses may be streamed with a broadcast signal or may be held in a local data base which may be pre-loaded into the end user's device prior to viewing the video sequence. When viewing information streamed with a broadcast, the information associated with a particular programme is streamed in parallel with the programme and stored locally. When the user selects an object, this local data is viewed.

The invention claimed is:

1. An apparatus for associating interactive data with an object in a digital video programme including means for providing a digital video programme having plural individual frames at least some of which incorporate said object, means for parsing the video programme by identifying separate shots in the video programme to produce an edit list, means for identifying shots containing related content to form a sequence of shots containing related content, means for selecting at least one key-frame within each sequence of shots, means for selecting said object within the key-frame with which the interactive data is to be associated, means for extracting attributes of the object from the key-frame, means for associating the interactive data with the object in the key-frame, means for utilising the attributes of the object for tracking the object through the sequence of shots, whereby said interactive data is associated with the object in the sequence of shots and said interactive data is embedded with data representative of said object in a data sequence.

2. An apparatus as claimed in claim 1, wherein the means for identifying shots containing related content to form a sequence of shots containing related content includes means for producing a hierarchy of groups of shots.

3. An apparatus as claimed in claim 1, wherein said means for parsing include means for inputting criteria to be used to recognise a change of shot.

4. An apparatus as claimed in claim 1, wherein the means for extracting attributes of the object includes means for isolating the object within a boundary formed on the frame, means for performing edge detection within the boundary to identify and locate edges of said object, and storing means for storing a geometric model of said object.

5. An apparatus as claimed in claim 1, wherein said means for extracting attributes of said object also includes means for recording at least one of the attributes of shape, size, position, colour, texture, intensity gradient of said object, and time series statistics based on said attributes.

6. An apparatus as claimed in claim 1, wherein said means for extracting attributes of said object includes means for comparing said attributes of said object with attributes of objects previously stored to determine whether the object is distinguishable therefrom, and when said object is determined not to be distinguishable, providing means for redefining the object.

7. An apparatus as claimed in claim 1, wherein said means for extracting said attributes includes means for comparing the location in the frame of said object with the location of objects already stored for that frame to determine whether that object is distinguishable therefrom, and where the location of said object is not distinguishable from the location of another object providing means for assigning rank to the objects to determine which object will be associated with that location.

8. An apparatus, as claimed in claim 1, wherein the means for utilising the attributes of the object for tracking the object includes means for updating the stored attributes of the object change from frame to frame.

9. An apparatus as claimed in claim 1, wherein said tracking means utilising the attributes of the object for tracking the object includes plural algorithm means for calculation of independent tracks of objects for use depending on the visual complexity of a sequence to automatically track objects in different types of visual environment.

10. An apparatus as claimed in claim 1, wherein said tracking means for utilising the attributes of the object for tracking includes means for converting all the frames to be tracked to a low-level representation, means for determining the position of each object in the frames by minimising a distance measure to locate each object in each frame, means for processing the positions of said object to smooth over occlusions and the entrances and exits of objects into and out of said frames, and means for reviewing the object within a tracked sequence and for correcting the location attributes of any misplaced objects.

11. An apparatus, as claimed in claim 1, wherein the means for associating interactive data with the object in the key-frame includes means for providing a database of different types of data including one or more of URLs, HTML pages, video clips, audio clips, text files and multimedia catalogues, and means for selecting said interactive content data from the database to associate with said object.

12. An apparatus, as claimed in claim 1, wherein the means for associating interactive data with the object in the key-frame produces said data sequence using means for determining whether the embedded interactive content data is frame synchronous data associated with object positions, shapes, ranks and pointers in a frame, or group-synchronous data associated with all the objects in a group, or is data to be streamed just in time, wherein means are provided for associating frame synchronous data with the corresponding frame, means are provided for associating group synchronous data with the frame at which a group changes, and means are provided for streaming just in time data to a user before it is required to be associated with the corresponding objects.

13. An apparatus as claimed in claim 1, wherein means are provided to associate different interactive content data with respectively different objects.

14. A method for associating interactive data with an object in a digital video programme including the steps of:

a) providing a digital video programme having a plurality of individual frames at least some of which incorporate said object with which interactive data is to be associated,
b) parsing the video programme by identifying separate shots in the video programme to produce an edit list,
c) identifying, from the edit list, shots containing related content to form a sequence of shots containing related content,
d) selecting at least one key-frame containing the object from within the sequence of shots,
e) locating said object within the at least one key-frame,
f) extracting attributes of the object from the at least one key-frame,
g) associating the interactive data with the object in the at least one key-frame,
h) tracking the object through the sequence of shots utilising the attributes of the object,
i) associating said interactive data with the object in frames in the sequence of shots, and
j) embedding said interactive data with data representative of said object in a data sequence representative of the digital video programme.

15. A method as claimed in claim 14, wherein step b) includes the step of inputting criteria (420) to be used to recognise a change of shot.

16. A method as claimed in claim 14, wherein step c) includes the step of producing a hierarchy of groups of sequences of shots.

17. A method as claimed in claim 14, wherein step e) includes the steps of: isolating the object (600) within a boundary (510) formed on the frame, performing edge detection within the boundary to identify and locate edges of said object, and step f) includes storing a geometric model of said object.

18. A method as claimed in claim 14, wherein step f) includes the step of recording at least one of the attributes of shape, size, position, colour, texture, intensity gradient of said object, and time series statistics based on said attributes.

19. A method as claimed in claim 14, wherein step f) includes the step of comparing said attributes of said object with attributes of objects previously stored to determine whether the object is distinguishable therefrom, and when said object is determined not to be distinguishable, the step of re-defining the object.

20. A method as claimed in claim 14, wherein step f) includes the step of comparing the location in the frame of said object with the location of objects already stored for that frame to determine whether that object is distinguishable therefrom, and where the location of said object is not distinguishable from the location of another object, the step of assigning rank to the objects to determine which object will be associated with that location.

21. A method as claimed in claim 14, wherein step h) includes the step of updating the stored attributes of the object as the attributes of the object change from frame to frame.

22. A method as claimed in claim 14, wherein step h) includes the step of using plural algorithm means for calculation of independent tracks of objects for use depending on the visual complexity of a sequence automatically to track said objects in different types of visual environment.

23. A method as claimed in claim 14, wherein step h) includes the steps of converting all the frames to be tracked to a low-level representation, determining the position of each object in the frames by minimising a distance measure to locate each object in each frame, processing the positions of said object to smooth over occlusions and the entrances and exits of objects into and out of said frames, reviewing the object within a tracked sequence and correcting the location attributes of any misplaced objects.

24. A method as claimed in claim 14, wherein step g) includes the steps of providing a database of different types of data including one or more of URLs, HTML pages, video clips, audio clips, text files and multimedia catalogues, and selecting said interactive content data from the database to associate with said object.

25. A method as claimed in claim 14, wherein step j) includes determining whether the embedded interactive content data is frame synchronous data associated with object positions, shapes, ranks and pointers in a frame, or group—synchronous data associated with all the objects in a group, or is data to be streamed just in time, and associating frame synchronous data with the corresponding frame, associating group synchronous data with the frame at which a group changes, and streaming just in time data to a user before it is required to be associated with the corresponding objects, respectively.

26. A method as claimed in claim 14, wherein in steps d) to j) different interactive content data are associated with respectively different objects.

27. A computer readable medium embodying a computer program comprising code means for performing all the steps of the method of claim 14 when the program is run on one or more computers.

28. An apparatus for associating interactive data with an object in a digital video programme including means for providing a digital video programme having plural individual frames at least some of which incorporate said object, means for parsing the video programme by identifying separate shots in the video programme to produce an edit list, means for identifying shots containing related content to form a sequence of shots containing related content, means for selecting at least one key-frame within each sequence of shots, means for selecting said object within the key-frame with which the interactive data is to be associated, means for extracting attributes of the object from the key-frame, means for associating the interactive data with the object in the key-frame, means for utilising the attributes of the object for tracking the object through the sequence of shots, whereby said interactive data is associated with the object in the sequence of shots and said interactive data is embedded with data representative of said object in a data sequence, wherein said means for extracting attributes of said object includes means for comparing said attributes of said object with attributes of objects previously stored to determine whether the object is distinguishable therefrom, and when said object is determined not to be distinguishable, providing means for redefining the object.

29. An apparatus for associating interactive data with an object in a digital video programme including means for providing a digital video programme having plural individual frames at least some of which incorporate said object, means for parsing the video programme by identifying separate shots in the video programme to produce an edit list, means for identifying shots containing related content to form a sequence of shots containing related content, means for selecting at least one key-frame within each sequence of shots, means for selecting said object within the key-frame with which the interactive data is to be associated, means for extracting attributes of the object from the key-frame, means for associating the interactive data with the object in the key-frame, means for utilising the attributes of the object for tracking the object through the sequence of shots, whereby said interactive data is associated with the object in the sequence of shots and said interactive data is embedded with data representative of said object in a data sequence, wherein said means for extracting said attributes includes means for comparing the location in the frame of said object with the location of objects already stored for that frame to determine whether that object is distinguishable therefrom, and where the location of said object is not distinguishable from the location of another object providing means for assigning rank to the objects to determine which object will be associated with that location.

30. An apparatus for associating interactive data with an object in a digital video programme including means for providing a digital video programme having plural individual frames at least some of which incorporate said object, means for parsing the video programme by identifying separate shots in the video programme to produce an edit list, means for identifying shots containing related content to form a sequence of shots containing related content, means for selecting at least one key-frame within each sequence of shots, means for selecting said object within the key-frame with which the interactive data is to be associated, means for extracting attributes of the object from the key-frame, means for associating the interactive data with the object in the key-frame, means for utilising the attributes of the object for tracking the object through the sequence of shots, whereby said interactive data is associated with the object in the sequence of shots and said interactive data is embedded with data representative of said object in a data sequence, wherein said tracking means utilising the attributes of the object for tracking the object includes plural algorithm means for calculation of independent tracks of objects for use depending on the visual complexity of a sequence to automatically track objects in different types of visual environment.

31. An apparatus for associating interactive data with an object in a digital video programme including means for providing a digital video programme having plural individual frames at least some of which incorporate said object, means for parsing the video programme by identifying separate shots in the video programme to produce an edit list, means for identifying shots containing related content to form a sequence of shots containing related content, means for selecting at least one key-frame within each sequence of shots, means for selecting said object within the key-frame with which the interactive data is to be associated, means for extracting attributes of the object from the key-frame, means for associating the interactive data with the object in the key-frame, means for utilising the attributes of the object for tracking the object through the sequence of shots, whereby said interactive data is associated with the object in the sequence of shots and said interactive data is embedded with data representative of said object in a data sequence, wherein said tracking means for utilising the attributes of the object for tracking includes means for converting all the frames to be tracked to a low-level representation, means for determining the position of each object in the frames by minimising a distance measure to locate each object in each frame, means for processing the positions of said object to smooth over occlusions and the entrances and exits of objects into and out of said frames, and means for reviewing the object within a tracked sequence and for correcting the location attributes of any misplaced objects.

32. A method for associating interactive data representative of an object with a digital video programme including the steps of:

a) providing a digital video programme having a plurality of individual frames at least some of which incorporate said object with which data is to be associated,
b) parsing the video programme by identifying separate shots in the video programme to produce an edit list,
c) identifying, from the edit list, shots containing related content to form a sequence of shots containing related content,
d) selecting at least one key-frame containing the object from within the sequence of shots,
e) locating said object within the at least one key-frame,
f) extracting attributes of the object from the at least one key-frame including comparing said attributes of said object with attributes of objects previously stored to determine whether the object is distinguishable therefrom, and when said object is determined not to be distinguishable, re-defining the object,
g) associating interactive data with the object in the at least one key-frame,
h) tracking the object through the sequence of shots utilising the attributes of the object,
i) associating said interactive data with the object in frames in the sequence of shots, and
j) embedding said interactive data with data representative of said object in a data sequence representative of the digital video programme.

33. A method for associating interactive data representative of an object with a digital video programme including the steps of:

a) providing a digital video programme having a plurality of individual frames at least some of which incorporate said object with which data is to be associated,
b) parsing the video programme by identifying separate shots in the video programme to produce an edit list,
c) identifying, from the edit list, shots containing related content to form a sequence of shots containing related content,
d) selecting at least one key-frame containing the object from within the sequence of shots,
e) locating said object within the at least one key-frame,
f) extracting attributes of the object from the at least one key-frame, including comparing the location in the frame of said object with the location of objects already stored for that frame to determine whether that object is distinguishable therefrom, and where the location of said object is not distinguishable from the location of another object, the step of assigning rank to the objects to determine which object will be associated with that location,
g) associating interactive data with the object in the at least one key-frame,
h) tracking the object through the sequence of shots utilising the attributes of the object,
i) associating said interactive data with the object in frames in the sequence of shots, and
j) embedding said interactive data with data representative of said object in a data sequence representative of the digital video programme.

34. A method for associating interactive data representative of an object with a digital video programme including the steps of:

a) providing a digital video programme having a plurality of individual frames at least some of which incorporate said object with which data is to be associated,
b) parsing the video programme by identifying separate shots in the video programme to produce an edit list, c) identifying, from the edit list, shots containing related content to form a sequence of shots containing related content,
d) selecting at least one key-frame containing the object from within the sequence of shots,
e) locating said object within the at least one key-frame,
f) extracting attributes of the object from the at least one key-frame,
g) associating interactive data with the object in the at least one key-frame,
h) tracking the object through the sequence of shots utilising the attributes of the object, including using plural algorithm means for calculation of independent tracks of objects for use depending on the visual complexity of a sequence automatically to track said objects in different types of visual environment,
i) associating said interactive data with the object in frames in the sequence of shots, and
j) embedding said interactive data with data representative of said object in a data sequence representative of the digital video programme.

35. A method for associating interactive data representative of an object with a digital video programme including the steps of:
a) providing a digital video programme having a plurality of individual frames at least some of which incorporate said object with which data is to be associated,
b) parsing the video programme by identifying separate shots in the video programme to produce an edit list,
c) identifying, from the edit list, shots containing related content to form a sequence of shots containing related content,
d) selecting at least one key-frame containing the object from within the sequence of shots,
e) locating said object within the at least one key-frame,
f) extracting attributes of the object from the at least one key-frame,
g) associating interactive data with the object in the at least one key-frame,
h) tracking the object through the sequence of shots utilising the attributes of the object, including converting all the frames to be tracked to a low-level representation, determining the position of each object in the frames by minimising a distance measure to locate each object in each frame, processing the positions of said object to smooth over occlusions and the entrances and exits of objects into and out of said frames, reviewing the object within a tracked sequence and correcting the location attributes of any misplaced objects,
i) associating said interactive data with the object in frames in the sequence of shots, and
j) embedding said interactive data with data representative of said object in a data sequence representative of the digital video programme.

\* \* \* \* \*